(No Model.)

C. F. PIKE.
PNEUMATIC DESPATCH TUBE AND CARRIER THEREFOR.

No. 574,938. Patented Jan. 12, 1897.

Witnesses:

Inventor:
Charles F. Pike,
by his Attorney,
Wm. A. Pike.

UNITED STATES PATENT OFFICE.

CHARLES F. PIKE, OF PHILADELPHIA, PENNSYLVANIA.

PNEUMATIC-DESPATCH TUBE AND CARRIER THEREFOR.

SPECIFICATION forming part of Letters Patent No. 574,938, dated January 12, 1897.

Application filed August 11, 1896. Serial No. 602,380. (No model.)

*To all whom it may concern:*

Be it known that I, CHARLES F. PIKE, a citizen of the United States, and a resident of the city of Philadelphia, State of Pennsylvania, have invented certain new and useful Improvements in Pneumatic-Despatch Tubes and Carriers Therefor, of which the following is a full, clear, and exact description, reference being had to the accompanying drawings, forming part of this specification.

My invention has relation generally to pneumatic-despatch-tube systems, and more particularly to that type or form in which the wheels of the carrier operate or travel in and upon trackways or longitudinally-depressed grooves.

My invention has for its object to reduce the running friction of the carrier to a minimum, to attain the maximum velocity with a given power, to reduce the danger of accident and breakage to the lowest possible degree, and provide the greatest diameter of carrier for a given diameter of tube.

My invention accordingly consists in the combinations, constructions, and arrangements of parts comprising the pneumatic-despatch tube and the trackways or longitudinally-depressed grooves upon which the carrier moves, as hereinafter described in the specification, and pointed out in the claims.

Reference is had to the accompanying drawings, wherein—

Figure 1:
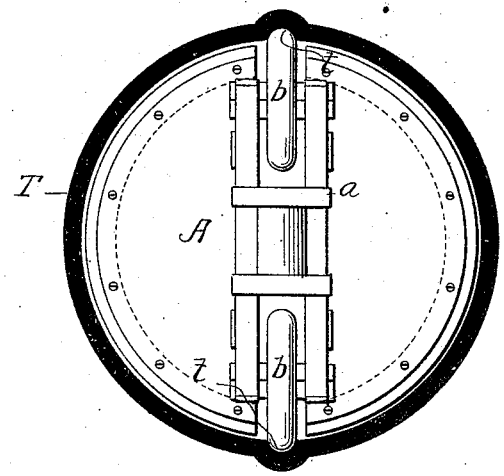
Figure 2:
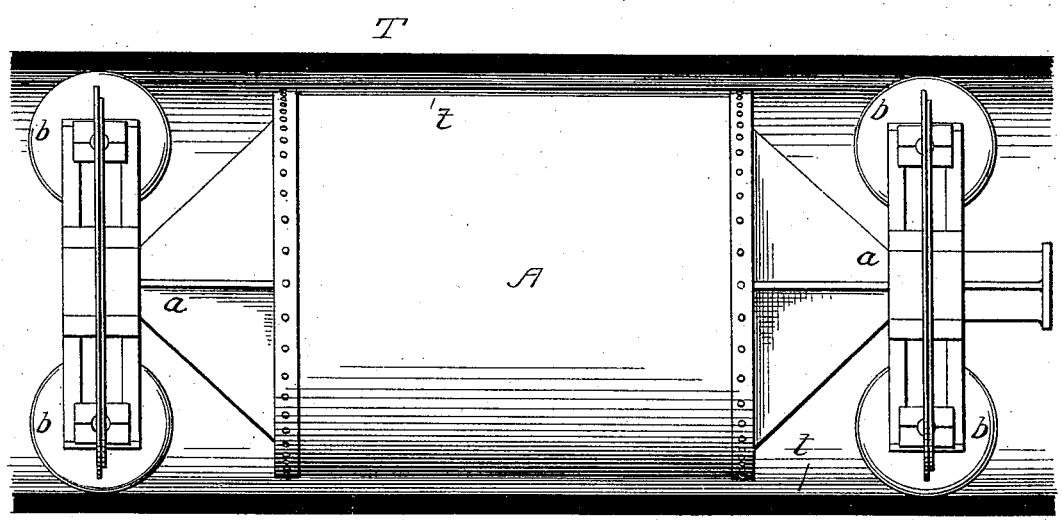

Figure 1 is a rear end view of the carrier and tube, showing the carrier in position in the tube. Fig. 2 is a longitudinal side elevation of the carrier in position in the tube, the tube being cut away longitudinally.

A represents the carrier, which may be of any suitable size and configuration desired or the requirements of service demand, and is provided with an open or sliding door, such as is usual, and which is not shown in the drawings, as such fixture or construction is well known.

At each end of the carrier are projections or brackets $a\ a$, which may be of any design or construction desired, and having upper and lower wheels $b$, attached to the end of each of said brackets, which may be secured in position and made operative by any of the well-known methods of mechanical construction. The outer periphery of said wheels $b$ are made or shaped to fit in the trackways or grooves of the tube upon which they travel.

The tube T has two depressed longitudinally-disposed trackways or grooves $t\ t$, provided integrally in the tube and beyond the line of the inner diameter situated diametrically opposite to each other in and upon which the wheels of the carrier travel.

Having thus described my invention, what I claim, and desire to secure by Letters Patent, is—

1. The combination of a pneumatic-despatch tube and carrier, said carrier having a diameter in cross-section approximately equal to the diameter of the bore of the tube, grooved trackways provided longitudinally in the tube beyond the line of the bore of the tube, wheels provided upon opposite ends of the carrier and adapted to travel in said longitudinal grooves, substantially as described.

2. In a pneumatic-despatch-tube system, a tube, a cylindrical carrier provided therein having a diameter approximately equal to the bore of the tube, longitudinally-grooved trackways integrally provided in said tube opposite each other, located beyond the line of the bore of the tube, wheels provided upon opposite ends of the said carrier adapted to travel in said longitudinal grooves, substantially as described.

In witness whereof I have hereunto set my hand this 3d day of August, A. D. 1896.

CHARLES F. PIKE.

Witnesses:
LOUIS E. PIKE,
JOHN A. SCHMITT.